United States Patent Office 3,189,574
Patented June 15, 1965

3,189,574
POLYPROPYLENE COMPOSITION CONTAINING AN AZELATE
Arthur H. Rogers, Jr., Longview, Tex., and James G. Stranch, Kingsport, Tenn., assignors to Eastman Kodak Company, Rochester, N.Y., a corporation of New Jersey
No Drawing. Filed Nov. 7, 1962, Ser. No. 236,131
8 Claims. (Cl. 260—31.8)

This invention relates to polypropylene compositions. More particularly, this invention relates to polypropylene compositions having improved properties. In a specific aspect, this invention relates to polypropylene compositions characterized by improved moldability, reduced tendency to blush or become opaque when under severe stress and improved low temperature toughness in comparison to polypropylene.

It is known that polypropylene, particularly in the partially or completely crystalline form, exhibits a number of desirable physical properties such as tensile strength and stiffness which make it particularly valuable in a variety of applications including, for example, fiber and film applications. However, a serious drawback of the use of polypropylene in many applications is its relatively poor low temperature properties and tendency to blush or become opaque under severe stress. Furthermore, since polypropylene is used extensively in molding operations, it would be desirable to improve its rate of flow since this would enable a molder to realize substantial economies by shortening the molding cycle with a resulting increase in output.

Attempts have been made to improve the physical properties of polypropylene by adding certain materials, for example, plasticizers, to the polymer. However, it has generally been found that plasticizers which have been used with other plastic materials have not been satisfactory with polypropylene because such materials, while improving some properties of polypropylene, for example, brittle point, have a substantial adverse effect on one or more other physical properties of the polymer such as melting point, tensile strength, etc. It is obvious, therefore, that the art will be greatly enhanced by polypropylene compositions in which specific properties of polypropylene are improved without adversely downgrading the other physical properties of the polymer.

Accordingly, it is an object of this invention to provide novel polypropylene compositions.

Another object of this invention is to provide novel polypropylene compositions exhibiting significantly improved properties in comparison to polypropylene.

Another object of this invention is to provide polypropylene compositions exhibiting improved low temperature toughness, decreased tendency to blush or become opaque under severe stress and better flow properties without materially downgrading the other desirable properties characteristic of polypropylene.

Still another object of this invention is to provide polypropylene compositions which, in molding operations, have a molding cycle which is reduced as much as 20% in comparison to the molding cycle of polypropylene.

Further objects and advantages of the invention will become apparent to those skilled in the art from an examination of the following disclosure and claims.

In accordance with this invention it has been found that solid, crystalline polypropylene, when blended with specific diesters of azelaic acid, as described herein, results in new compositions exhibiting outstanding physical properties. Hence, blends of solid, crystalline polypropylene containing about .5 to about 25%, by weight, and more preferably about 5 to about 20%, by weight, of one or more diesters of azelaic acid having the formula:

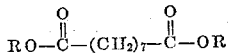

where each R is a saturated aliphatic hydrocarbon radical containing 4–10 carbon atoms, exhibit improved properties, particularly low temperature toughness, a decreased tendency to blush or become opaque under severe stress and improved flow in molding applications, without any material downgrading of the other desirable physical properties characteristic of polypropylene.

The results achieved by the practice of this invention could not have been predicted from the prior art. Thus, diesters of adipic acid (a homolog of azelaic acid) such as diethylhexyl adipate an diisohexyl adipate, as well as other diesters of dicarboxylic acid, for example, dioctyl phthalate, have been found, by prior art workers, to be unsuitable for improving the low temperature properties of polypropylene. In view of the prior art, therefore, it was surprising to find that the specific diesters of azelaic acid described herein could be used to improve the low temperature toughness of polypropylene as well as its moldability and optical characteristics under severe stress.

A particularly interesting feature of this invention is the fact that the molding cycle of a polypropylene composition of the type described herein is substantially reduced in comparison to the molding cycle for a conventional polypropylene molding formulation. This is of particular interest to the molder since it enables him to increase the output of a particular molding machine which is, of course, a substantial economic advantage.

The additives employed in the practice of this invention are generally known to those skilled in the art and have the formula:

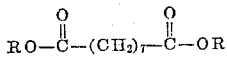

where each R is a saturated aliphatic hydrocarbon radical containing 4–10 carbon atoms. Suitable R radicals contain 4–10 carbon atoms, preferably 4–8 carbon atoms and can be, for example, alkyl or cycloalkyl radicals. Examples of such radicals include butyl, isobutyl, pentyl, isopentyl, hexyl, 2-ethyl hexyl, octyl, decyl, isodecyl and the like. The preferred compound used in practicing the invention is di-2-ethyl hexyl azelate although compounds such as diisobutyl or diisodecyl azelate give satisfactory results.

Any normally solid, crystalline polypropylene, as shown by partial or complete insolubility in boiling hexane or by X-ray diffraction, can be employed in the practice of this invention. Polypropylene of this type can contain small amounts, for example, less than 20%, of amorphous polymer and has been extensively described in the prior art. Such polypropylene generally has a density of at least 0.90 and more preferably a density in the range of about .91 to about .92, a molecular weight of at least 10,000 and more preferably about 20,000 to about 250,000, as determined from inherent viscosity in tetralin at 145° C. using the Staudinger equation. The inherent viscosity of this polypropylene in tetralin at 145° C. is, therefore, generally at least about .14 and more preferably about .7 to about 3.5. The polypropylene which has been found to give extremely good results in the compositions described herein is that which is highly crystalline and has a flow rate in the range of about 0.1 to about 30.0 g. per 10 minutes at 230° C. under a 2.16 kg. load measured according to ASTM D1238.

Blends of solid, crystalline polypropylene with one or more of the azelaic acid diesters herein can be prepared in any desired manner, whether it be mechanical mixing, or other blending method. Thus, they can be prepared at elevated temperatures on rolls, in a Banbury mixer, in a compounding extruder or any other suitable type of processing equipment. Any method wherein the polypropylene is melted and the azelate is mixed with it while melted will generally produce the desired results. However, the method employed to prepare the blends should be one which ensures a uniform mixture of polypropylene with the azelaic acid diester in the final product.

In general, as little as about .5%, by weight, of the diester of azelaic acid, based on the blend, will accomplish the desired results. However, where a substantial improvement in specific physical properties, for example low temperature toughness, is desired, percentages of at least 1% should be employed. It is preferred, however, that percentages in the range of about 5 to about 20% be employed, although percentages up to and including 25% give satisfactory results. More than 25%, by weight, of the diester can be incorporated into the polypropylene, but the best combination of moldability, compatibility, strength and toughness are achieved at percentages of less than 25%. Master batches containing a higher percentage of azelate can also be prepared first and then this master batch compounded with polypropylene to produce a composition containing the desired amount of azelate.

Although the compositions of this invention are composed essentially of polypropylene with small amounts of the specific azelates described herein, they can also contain small amounts of other desirable additives such as high melting waxes, antioxidants, dyes and pigments for coloring the polymer, lubricants, ultraviolet inhibitors, stabilizers, polyisobutylene, polyethylene, inert fillers, antistatic agents and oxidative inhibitors such as 4,4'-butylene bis(6-tertiary butyl-m-cresol), 4,4'-thio bis(6-tertiary butyl-m-cresol), dilauryl-3,3'-thiodipropionate and ditertiary butyl-p-cresol, provided the additional ingredients are not present in amounts sufficient to alter the desirable properties of polypropylene compositions adversely.

This invention can be further illustrated by the following examples of preferred embodiments thereof although it will be understood that these examples are included merely for purposes of illustration and are not intended to limit the scope of the invention unless otherwise specifically indicated.

EXAMPLE 1

Using a Banbury mixer, 3%, by weight, of di-2-ethylhexyl azelate is incorporated into solid, crystalline, polypropylene having a flow rate of 3.2 at 230° C. under a 2.16 kg. load (ASTM D1238) and an unnotched Izod impact strength of 3.3 ft.-lbs. per inch of width at −10° C. (ASTM D758). The resulting polypropylene composition has a flow rate of 4.5 and an unnotched Izod impact strength of 18 ft.-lbs. per inch of width at −10° C. Thus, incorporation of the azelate into the polypropylene significantly increases low temperature toughness.

The novel polypropylene composition prepared above, as a result of its increased flow rate, in a standard molding operation, requires only a 41 second cycle as contrasted to the 51 second cycle required for the same polypropylene containing no azelate in the same operation. This reduction in cycle time of approximately 20%, of course, represents a substantial economic advantage.

The reduced tendency of the polypropylene composition prepared above to blush or become opaque under stress, as compared with the same polypropylene containing no azelate, can be demonstrated by flexing molded samples prepared from each material. When subjected to this test, it is found that the samples prepared from the polypropylene composition of this invention can be flexed many more times than those prepared from the same polypropylene containing no azelate without showing the same degree of blushing.

EXAMPLE 2

Using a Banbury mixer, 10%, by weight, of di-2-ethylhexyl azelate is incorporated into solid, crystalline polypropylene having a flow rate of 2.5 at 230° C. under a 2.16 kg. load (ASTM D1238) and an unnotched Izod impact strength of 4 ft.-lbs. per inch of width at −10° C. (ASTM D758). The resulting polypropylene composition has a flow rate of 5.1, an unnotched Izod impact strength at −10° C. greater than 80 ft.-lbs. and shows a substantially reduced tendency to blush under stress when compared to the same polypropylene containing no azelate.

As indicated hereinbefore, the di-2-ethylhexyl azelate is preferred in practicing this invention. However, any diester of azelaic acid having the formula set forth hereinabove can be used. Thus, the substitution of diisobutyl, didecyl or diisodecyl azelate for di-2-ethylhexyl azelate in the above procedure gives satisfactory results.

EXAMPLE 3

Using a Banbury mixer, 10%, by weight, of di-2-ethylhexyl azelate is incorporated into solid, crystalline polypropylene having a flow rate of 11 at 230° C. under a 2.16 kg. load (ASTM D1238) and an unnotched Izod impact strength of 3.4 ft.-lbs. per inch of width at −10° C. (ASTM D758). The resulting polypropylene composition has a flow rate of 22 and an unnotched Izod impact strength greater than 80 ft.-lbs.

EXAMPLE 4

The preferred amounts of diester of azelaic acid employed in the practice of this invention is about 5 to about 20 weight percent. To illustrate, a Banbury mixer is used to incorporate 5, 10, 15 and 20%, by weight, of di-2-ethylhexyl azelate into polypropylene having a density of 0.903, an inherent viscosity of 1.73 in tetralin at 145° C., a flow rate of 5.1 at 230° C. under a 2.16 kg. load (ASTM D1238) and an unnotched Izod impact strength at −10° C. of 2.1 ft.-lbs. per inch of width (ASTM D758). The resulting compositions have the following properties:

Table

| Run No. | 1 | 2 | 3 | 4 | 5 |
| --- | --- | --- | --- | --- | --- |
| Polypropylene, wt. percent | 100 | 95 | 90 | 85 | 80 |
| Di-2-ethylhexyl azelate, wt. percent | | 5 | 10 | 15 | 20 |
| Density, g. per ml. (ASTM D1505) | .903 | .900 | .905 | .905 | .905 |
| Flow rate, 2.16 kg. load at 230° C., dg. per min. (ASTM D1238) | 5.1 | 7.5 | 11 | 14 | 37 |
| Inherent Viscosity in Tetralin at 145° C. | 1.37 | 1.32 | 1.26 | 1.20 | 1.17 |
| Unnotched Izod Impact Strength, ft.-lbs. per inch of width at −10° C. (ASTM D758) | 3.1 | >80 | >80 | >80 | 6.1 |

Thus, by the practice of this invention there is provided polypropylene compositions exhibiting significantly improved properties. Specifically, such compositions exhibit improved moldability, increased low temperature toughness and reduced tendency to blush or become opaque under stress in comparison to conventional polypropylene. In addition, there is less tendency for other additives such as antioxidants to exude from the compositions of this invention at elevated temperatures. These compositions can, of course, be employed as substitutes for polypropylene where their improved properties are of significance. For example, in packaging material for frozen foods, wire and cable insulations, plastic pipe, etc. A particularly significant characteristic of the compositions of this invention is reduced plate-out of additives. Plating-out of additives is a serious problem often encountered with slip modified or stabilzed polypropylene. The additives which are described herein are particularly effective for improving the properties of polypropylene. However, other additives which we have found to improve certain properties of polypropylene, in amounts up to about 20%, by weight, are diesters of dibasic aliphatic acids containing 8–13 carbon atoms between the carboxyl groups with aliphatic alcohols containing 4–20 carbon atoms, esters of monobasic aliphatic acids containing 9–20 carbon atoms with aliphatic alcohols containing 3–20 carbon atoms or alkoxy ethyl alcohols containing 3–6 carbon atoms, diesters of aliphatic diols containing 4–10 carbon atoms with monobasic aliphatic acids containing 4–20 carbon atoms. Examples of such compounds are 2,2,2-trimethyl-1,3-pentanediol monoisobutyrate, mono-2-ethylhexanoate, methoxyethylpalmitate, lauryl oleate and butoxyethyl stearate.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. A composition consisting essentially of solid, crystalline polypropylene and about .5 to about 25%, by weight, of a diester of azelaic acid having the formula:

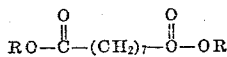

where R is a saturated aliphatic hydrocarbon radical containing 4–10 carbon atoms.

2. A composition consisting essentially of solid, crystalline polypropylene and about 1 to about 25%, by weight, of a diester of azelaic acid having the formula:

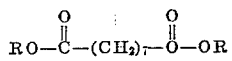

where R is a saturated aliphatic hydrocarbon radical containing 4–10 carbon atoms.

3. A composition consisting essentially of solid, crystalline polypropylene and about 5 to about 25%, by weight, of a diester of azelaic acid having the formula:

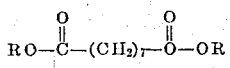

where R is an alkyl radical containing 4–10 carbon atoms.

4. A composition consisting essentially of solid, crystalline polypropylene and about 5 to about 20%, by weight, of di-2-ethylhexyl azelate.

5. A composition consisting essentially of solid, crystalline polypropylene and about 5%, by weight, of di-2-ethylhexyl azelate.

6. A composition consisting essentially of solid, crystalline polypropylene and about 10%, by weight, of di-2-ethylhexyl azelate.

7. A composition consisting essentially of solid, crystalline polypropylene and about 15%, by weight, of di-2-ethylhexyl azelate.

8. A composition consisting essentially of solid, crystalline polypropylene and about 20%, by weight, of di-2-ethylhexyl azelate.

References Cited by the Examiner
UNITED STATES PATENTS

| | | | |
|---|---|---|---|
| 2,628,249 | 2/53 | Bruno | 260—485 |
| 2,940,949 | 6/60 | Mullin | 260—31.8 |
| 2,978,430 | 4/61 | Thompson et al. | 260—31.8 |

MORRIS LIEBMAN, *Primary Examiner.*